3,829,432
PROCESS FOR THE OXIDATION OF QUINOLINE
Jacques D. V. Hanotier and Monique G. S. Hanotier-Bridoux, Brussels, Belgium, assignors to Labofina S.A., Brussels, Belgium
No Drawing. Filed Apr. 2, 1973, Ser. No. 347,052
Int. Cl. C07d 31/36
U.S. Cl. 260—295.5 R         9 Claims

ABSTRACT OF THE DISCLOSURE

A process for the oxidation of quinoline into quinolinic acid which comprises reacting qiunoline with a cobalt salt in a molar ratio of quinoline to cobalt salt lower than 2, while maintaining a concentraiton of cobaltic ions such that $2x-A$ is between 0.1 and 1.5, $x$ and $A$ being respectively the molarity of said cobaltic ions and said cobalt salt in the reaction mixture, such reaction being carried out at a temperature between 40 and 150° C. in the presence of an aliphatic carboxylic acid having from 2 to 4 carbon atoms and in the presence of molecular oxygen at a partial pressure of from 0.2 to 20 atomspheres.

---

The present invention relates to a process for the oxidation of quinoline (I) or 2,3-benzopyridine into quinolinic acid (II) or 2,3-pyridinedicarboxylic acid.

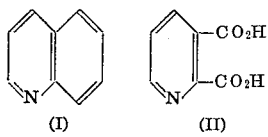

Quinolinic acid is used as a synthesis intermediate for the manufacture of pharmaceutical products, insecticides and pigments.

Quinolinic acid can be prepared from quinoline, either by chemical oxidation with agents such as potassium permanganate or hydrogen peroxide, or by electrochemical oxidation. These processes are only applied in the laboratory and they are not commercially feasible due to their high cost. On the other hand, the known processes for the oxidation of naphthalene into phthalic acid or anhydride cannot be applied to quinoline because they require high temperatures and, under these conditions, quinolinic acid is quickly decarboxylated into nicotinic acid.

An object of the present invention is to provide a new method for the oxidation in high yields of quinoline at moderate temperatures.

Another object of the invention is to provide a new method for the oxidation of quinoline into quinolinic acid with an oxidizing agent which is easily regenerated.

Other objects and advantages of the invention will appear hereinafter.

The process of the present invention for the oxidation of quinoline into quinolinic acid comprises reacting quinoline with a cobalt salt in a molar ratio of quinoline to cobalt salt lower than 2, while maintaining a concentration of cobaltic ions such that $2x-A$ is between 0.1 and 1.5, $x$ and $A$ being respectively the molarity of the cobaltic ions and of the cobalt salt in the reaction mixture, such reaction being carried out at a temperature between 40 and 150° C., and in the presence of an aliphatic carboxylic acid having from 2 to 4 carbon atoms and in the presence of molecular oxygen at a partial pressure of from 0.2 to 20 atmospheres.

It has been found quite unexpectedly that the conversion of quinoline can proceed only when the quinoline and cobalt salt are used in a low molar ratio of quinoline to cobalt salt, preferably lower than 2. Therefore, it is necessary to restrict the amount of quinoline used based on the amount of cobalt salt which can be realized by using a solvent in which both reactants are quite soluble. Such a solvent must be substantially inert against oxidation at the conditions used. Among the solvents which are useful to fulfill these conditions are the lower fatty acids containing from 2 to 4 carbon atoms, such as acetic acid, which is particularly useful. In the practice of this invention, the solvent may contain water in an amount up to 50% by volume of the reaction mixture, but preferably the amount of water is lower than 10 volume percent.

Another important feature of the present invention resides in the fact that contacting quinoline with the cobalt salt in a solvent and at the temperature range hereinabove defined, an effective oxidation takes place only when the molarity $A$ of the cobalt salt and the molarity $x$ of the cobaltic ions in the reaction mixture are such that $2x-A$ is between 0.1 and 1.5. To achieve this, the cobalt salt must be used in a concentration of at least 0.1 when it is entirely a cobaltic salt. However, a high concentration of cobaltic ions is not enough by itself to secure an effective oxidation when the total concentration of cobalt is too high. Activity of the cobaltic ions is drastically reduced when $2x-A$ is lower than 0.1, even when $A$ is high, and this activity is practically negligible when $2x-A=0$. Consequently, $2x-A$ may be considered as being the active concentration of cobaltic species or active Co(III) and will be referred hereinafter as "active Co(III)."

When the concentrations of quinoline, cobalt salt and active Co(III) fulfill the conditions hereinabove specified, the oxidation of quinoline proceeds at temperatures of between 40 and 150° C., but preferably between 70 and 120° C. Such temperatures are lower than the decomposition temperature of quinolinic acid. By employing such conditions, the quinoline acid is produced with high yields, generally higher than 80% of theoretical.

In the preferred mode of oxidizing quinoline into quinolinic acid, molecular oxygen is introduced into the reaction zone. Pure oxygen or any oxygen containing gas such as air may be used for this purpose. In most instances, the partial pressure of oxygen may be between 0.2 and 20 atmospheres or higher.

The cobaltic salt used in the process of the present invention works as a reactant in that it is reduced as the reaction proceeds into a lower valency state. Therefore, even when starting with a high concentration of cobaltic ions, the concentration would rapidly fall below the limit required for active oxidation to proceed. To achieve high yields of quinolinic acid in accordance with the present invention, it is necessary to regenerate the active cobalt (III) by reoxidizing the cobaltous species produced as a result of the reaction. This regeneration can be carried out continuously or intermittently, in the reaction vessel or separately, by known means, e.g. by anodic oxidation or by chemical agents such as ozone or peroxidic compounds, or by co-oxidation with an aldehyde

or a ketone

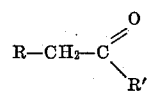

wherein R and R' are lower alkyl radicals. A particularly convenient method is to continuously supply acetaldehyde or methylethylketone into the reaction zone at a rate controlled such as to maintain the above defined desired level of active cobalt(III).

The cobalt salts which are used in the practice of the present invention are most often the salts of carboxylic acids. Such salts are particularly suitable due to their solubility in the reaction media. Although any of the cobalt salts of carboxylic acids may be employed, the salts of the lower fatty acids containing 2 to 4 carbon atoms are particularly advantageous. Such salts readily form the cobaltic form from the corresponding cobaltous form. From the standpoint of convenience, the cobalt salt employed is usually the cobaltic salt of the acid employed as a solvent as hereinabove discussed.

The present invention will be further described with reference to the following examples which are given only for a purpose of illustration, and are not intended to limit the scope of said invention.

EXAMPLE 1

Into a stainless steel autoclave equipped with a mechanical agitating device, a heating jacket, a cooling coil, a gas inlet tube and a vent, there were charged 210 ml. of a solution containing 0.060 mole of quinoline and 0.240 mole of cobalt acetate in acetic acid. The molar ratio of quinoline to cobalt salt was 0.25. The ratio of cobaltic ions to total cobalt in this solution was 0.90 with the concentration of active cobalt(III) being about 0.91 atom-gram per liter.

Air was introduced into the reaction mixture at a rate of 100 liters per hour while stirring and maintaining the pressure at 10 kg. per cm.$^2$. In order to ensure that the concentration of active cobalt(III) remained above 0.1 atom-gram per liter throughout the reaction, acetaldehyde was fed into the reaction mixture at a rate of 5 grams per hour as a 35 wt. percent solution in acetic acid. The mixture was heated at 80° C. for six hours.

At the end of the reaction period, the reaction mixture was cooled and withdrawn after depressurization of the autoclave. Active cobalt(III) determined on an aliquot was still at a concentration of 0.58 atom-gram per liter in spite of the fact that the initial solution had been diluted with the acetaldehyde solution.

To determine quinolinic acid produced from quinoline, another aliquot portion of the reaction mixture was treated with an aqueous solution of a ferrous salt to reduce cobaltic ions. The resulting mixture was then evaporated to dryness and the residue treated with aqueous alkali. Precipitated metals were removed by centrifugation. The clear alkaline solution was extracted with ether to remove unreacted quinoline and then analyzed for quinolinic acid by U.V. spectrophotometry. Unreacted quinoline was determined from still another aliquot portion. From the analyses, it was found that 78% of the starting quinoline had been transformed with a selectivity of 90% to quinolinic acid.

By way of comparison, the same procedure was repeated except that the amount of quinoline was 0.600 mole, while the amount of cobalt acetate was 0.240 mole. The molar ratio of quinoline to cobalt salt was 2.5. Only 2.3% of quinoline was oxidized into quinolinic acid, instead of 78%.

EXAMPLE 2

The procedure of Example 1 was repeated except that cobalt propionate was substituted for cobalt acetate and propionic acid was used as a solvent. Also, the initial concentration of active cobalt(III) was 0.65 instead of 0.91 atom-gram per liter.

A good yield of quinolinic acid was obtained.

EXAMPLE 3

The procedure of Example 1 was repeated except that temperature was 100° C. The analysis of the reaction mixture showed that 88% of the starting quinoline had been transformed with a selectivity of 98% to quinolinic acid.

EXAMPLE 4

The procedure of Example 3 was repeated except that methylethylketone was substituted for acetaldehyde on a molar base. The analysis of the reaction mixture showed that 96% of the starting quinoline had been transformed with a selectivity of 88% to quinolinic acid.

We claim:

1. A process for the oxidation of quinoline into quinolinic acid which comprises reacting quinoline with a cobalt salt in a molar ratio of quinoline to cobalt salt lower than 2, while maintaining a concentration of cobaltic ions such that $2x - A$ is between 0.1 and 1.5, $x$ and A being respectively the molarity of said cobaltic ions and said cobalt salt in the reaction mixture, such reaction being carried out at a temperature between 40 and 150° C. in the presence of an aliphatic carboxylic acid having from 2 to 4 carbon atoms and in the presence of molecular oxygen at a partial pressure of from 0.2 to 20 atmospheres.

2. The process of Claim 1 wherein the temperature is between 70 and 120° C.

3. The process of Claim 1 wherein the reaction is carried out in the presence of an aldehyde having the formula

in which R is a lower alkyl radical.

4. The process of Claim 1 wherein the reaction is carried out in the presence of a ketone having the formula

in which R and R' are lower alkyl radicals.

5. The process of Claim 1 wherein air is used as the oxygen source.

6. The process of Claim 1 wherein said cobalt salt is cobalt acetate.

7. The process of Claim 1 wherein the reaction is carried out in the presence of a solvent.

8. The process of Claim 7 wherein the solvent is a lower fatty acid of 2 to 4 carbon atoms.

9. The process of Claim 8 wherein the solvent is acetic acid.

References Cited

UNITED STATES PATENTS

| | | | |
|---|---|---|---|
| 2,907,792 | 10/1959 | McIntyre | 260—523 |
| 2,946,801 | 7/1960 | Fields | 260—295 R |
| 2,959,613 | 11/1960 | Whitfield | 260—524 R |

OTHER REFERENCES

Klingsberg: Pyridine And Its Derivatives, Part I, Interscience Pub., pp. 251–268 (1960).

ALAN L. ROTMAN, Primary Examiner

U.S. Cl. X.R.

260—295 R